(12) United States Patent
Arkas (10) Patent No.: US 6,928,219 B2
(45) Date of Patent: Aug. 9, 2005

(54) OPTICAL CHANNEL PLATES WITH OPTICAL FIBERS OR HOLLOW WAVEGUIDES

(75) Inventor: Evangelos Arkas, London (GB)

(73) Assignee: Ralph Alexander Wimmer, West Vancouver (CA)

( * ) Notice: Subject to any disclaimer, the term of this patent is extended or adjusted under 35 U.S.C. 154(b) by 143 days.

(21) Appl. No.: 10/332,744

(22) PCT Filed: Jul. 12, 2001

(86) PCT No.: PCT/GB01/03157

§ 371 (c)(1),
(2), (4) Date: Jun. 23, 2003

(87) PCT Pub. No.: WO02/06865

PCT Pub. Date: Jan. 24, 2002

(65) Prior Publication Data

US 2004/0022506 A1 Feb. 5, 2004

(30) Foreign Application Priority Data

Jul. 14, 2000 (GB) .............................. 0017371

(51) Int. Cl.[7] .................................................. G02B 6/04
(52) U.S. Cl. ....................................... 385/120; 385/116
(58) Field of Search ............................ 385/14, 115, 116, 385/120, 121

(56) References Cited

U.S. PATENT DOCUMENTS

| | | |
|---|---|---|
| 2,825,260 A | 3/1958 | O'Brien |
| 3,387,959 A | 6/1968 | Cole |
| 3,853,658 A | 12/1974 | Ney |
| 4,397,524 A | 8/1983 | Yoshimura et al. |
| 4,415,810 A | 11/1983 | Brown |
| 4,573,082 A | 2/1986 | Jeskey |
| 4,737,013 A | 4/1988 | Wilcox |
| 4,743,090 A | 5/1988 | Reidinger |
| 5,061,029 A | 10/1991 | Ishikawa |
| 5,127,080 A | 6/1992 | Duggan |
| 5,129,028 A * | 7/1992 | Soltan ........................ 385/120 |
| 5,157,753 A | 10/1992 | Rogers, Jr. |
| 5,217,285 A | 6/1993 | Sopori |
| 5,245,686 A | 9/1993 | Faris et al. |
| 5,381,502 A | 1/1995 | Veligdan |
| 5,565,729 A | 10/1996 | Fairs et al. |
| 5,771,039 A | 6/1998 | Ditzik |
| 5,911,024 A * | 6/1999 | Wallace ...................... 385/120 |

FOREIGN PATENT DOCUMENTS

| | | |
|---|---|---|
| EP | 0753958 | 1/1997 |
| GB | 1061820 | 3/1967 |
| GB | 1064072 | 4/1967 |
| GB | 1277362 | 6/1972 |
| GB | 1369052 | 10/1974 |
| GB | 2251954 | 7/1992 |
| GB | 2253070 | 8/1992 |
| GB | 2360603 | 9/2001 |
| NL | 8201114 | 10/1983 |
| WO | WO 96/21884 | 7/1996 |

* cited by examiner

Primary Examiner—Phan T. H. Palmer
(74) Attorney, Agent, or Firm—Timothy J. Keefer; Seyfarth Shaw LLP (57) ABSTRACT

A method of forming a solid or honeycombed optical channel plate, having solid or hollow waveguides respectively, from aligned optical waveguides. Reflective optical channel plates are also disclosed for use with a front projection screen and transmission optical channel plates are also disclosed for use with a front projection screen and transmission optical channel plates for use with a rear projection screen for increasing luminance and/or resolution of an image projected on the screen.

13 Claims, 13 Drawing Sheets

OPTICAL CHANNEL PLATES WITH OPTICAL FIBERS OR HOLLOW WAVEGUIDES

This invention relates to reflection and transmission optical channel plates, in particular for use with display devices.

The use of optical channel plates, or face plates, in association with display devices is known. For example, U.S. Pat. No. 5,911,024 discloses a fibre optic display constructed from a plurality of short optical fibres whereby an enlarged image can be produced from a cathode ray tube. Similarly a front fibre optic face plate for use in a liquid crystal display has been disclosed in, for example, U.S. Pat. No. 5,959,711.

One application of the present invention is for front projection screens. The flat surface of known front projection screens is not shielded from stray light and reflections of the stray light from the screen can degrade an image projected on the screen. Moreover, light incident on the screen is scattered with only a small proportion of the incident light being reflected towards a viewer. In order to seek to overcome this problem, use has been made of metallised fabrics or plastics with some success but only for applications where the screen is viewed from a distance.

There are also problems with existing rear projection screens, such as those used for large screen televisions, that when viewed at wide angles the image is subject to disturbing colour separation.

Problems also exist, which are common to front and rear projection screens, of diffusion of light from a single point on the screen resulting in a fuzzy image. This contributes to the fact that only very small viewing angles can be used for large screens, especially for rear projection screens.

There are also particular problems with the use of cathode ray tube displays. In particular, the tubes have high power consumption and geometric distortion is introduced by the displays. To overcome the geometric distortion the displays require further magnetic elements in addition to cathode ray tube deflecting coils. There is also a possible problem of harmful radiation levels from prolonged exposure to cathode ray tubes. Although liquid crystal displays potentially would overcome many of these problems, liquid crystal displays suffer even more than cathode ray tubes from difficult viewing under strong lighting conditions, particularly due to reflections of stray or ambient light from the screen.

It is an object of this invention to seek at least partially to ameliorate these difficulties.

It is a particular object of the present invention to provide an alternative method for the production of optical channel plates.

According to a first embodiment of a first aspect of the present invention there is provided a method for forming a solid optical channel plate comprising the steps of: a) providing optical fibres with respective longitudinal axes in side-by-side relationship; b) using mechanical aligning means to align the optical fibres in a two dimensional array with the respective longitudinal axes substantially parallel, to form a substantially regular geometric pattern in cross-section; c) adhering the optical fibres together along at least a portion of their longitudinal surfaces; and d) transversely slicing the array of optical fibres to form at least one optical channel plate.

Conveniently, the step of providing optical fibres in side-by-side relationship includes heating and pulling the optical fibres to form tapering fibres.

Preferably, the step of providing optical fibres in side-by-side relationship includes the step of coating the optical fibres with coatings along longitudinal surfaces of the optical fibres to increase internal optical reflectivity of the optical fibres.

Advantageously, the step of coating the optical fibres includes coating by electroplating.

Advantageously, the step of aligning the optical fibres with mechanical means includes the step of aligning the optical fibres with ultrasonic vibrating means.

Conveniently, the step of adhering the optical fibres includes ultrasonically vibrating the optical fibres such that portions of the coatings of adjacent optical fibres are heated and welded together.

Alternatively, the step of the adhering the optical fibres comprises using adhesive.

Conveniently, the step of transversely slicing the array to form at least one optical channel plate includes the further step, after slicing the array, of polishing at least one of the opposed end surfaces of the optical fibres, which together form opposed end surfaces of the at least one optical channel plate.

Advantageously, the step of polishing the at least one of the opposed end surfaces of the at least one optical channel plate includes coating one of the end surfaces of the at least one optical channel plate to increase the internal optical reflectivity of the respective end surfaces of the at least one optical channel plate, to form at least one reflective solid optical channel plate.

Conveniently, the step of providing optical fibres in side-by-side relationship includes providing optical fibres having a circular transverse cross-section.

Alternatively, the step of providing optical fibres in side-by-side relationship includes providing optical fibres having a polygonal, preferably hexagonal, transverse cross-section.

According to a second embodiment of the first aspect of the present invention, there is provided a method of forming a honeycombed optical channel plate comprising the steps of; a) providing an array of aligned coated fibres, the fibres having optically reflective coatings with a melting point higher than that of the fibres; b) transversely slicing the array of coated fibres to form at least one plate of coated fibres; c) heating the at least one plate of coated fibres to melt the fibres to form molten fibre material; and d) removing the molten fibre material from the at least one plate of coated fibres to leave the optically reflective coatings as hollow optical waveguides forming a honeycombed optical channel plate.

Conveniently, the step a) of providing an array of aligned coated fibres includes the steps of providing an array of aligned fibres longitudinally spaced apart by longitudinal interstitial spaces; and passing coating solution between the aligned, spaced apart, fibres to fill the interstitial spaces and thereby coat the fibres along their lengths to form an array of coated fibres having optically reflective coatings with a melting point higher than that of the fibres, such that the optically reflective coatings cause the fibres to adhere together along their lengths.

Advantageously, the step of providing an array of aligned, coated fibres includes the step of aligning the fibres using ultrasonic vibrating means.

Conveniently, the step of providing an array includes heating and pulling the fibres to formed tapering fibres.

Advantageously, the fibres are coated by electroplating.

Conveniently, the step of providing an array of aligned fibres includes providing fibres having a circular transverse cross-section.

Alternatively, the step of providing an array of aligned fibres includes providing fibres having a polygonal, preferably hexagonal, transverse cross-section.

Conveniently, the step of slicing the array to form at least one plate includes coating a major face of the at least one plate with an optically reflective end coating, such that the step of removing the molten fibre material from the at least one plate leaves the optically reflective coatings as hollow optical waveguides closed at one end by the optically reflective end coating, to form a reflective honeycombed optical channel plate.

According to a third embodiment of the first aspect of the present invention, there is provided a method for forming an optical channel plate comprising the steps of: a) providing an array of aligned optical waveguides interconnected in side-by-side relationship spaced apart by interstitial spaces; b) clamping the optical waveguides in position with respect to each other to form clamped optical waveguides; c) transversely slicing the array of waveguides to form at least one clamped optical waveguide plate with interstitial spaces; d) filling the interstitial spaces in the waveguide plate with optically reflective coating material to improve the internal optical reflectivity of the waveguides and to adhere the waveguides together in the array; and e) unclamping the clamped optical waveguide plate to form an optical channel plate.

Conveniently, the step of providing an array of aligned optical waveguides includes using ultrasonic vibrating means to align the optical waveguides.

According to a fourth embodiment of the first aspect of the invention, there is provided a method of forming an optical channel plate comprising substantially parallel hollow optical waveguides, the method comprising the steps of: a) providing a plurality of corrugated sheets of optically reflective material; b) stacking the plurality of corrugated sheets one upon another to form substantially parallel spaced apart optical waveguides between adjacent stacked sheets; and c) adhering adjacent sheets to each other.

Conveniently, the step of providing a plurality of corrugated sheets of optically reflective material includes the step of coating sheets of non-optically reflective material with an optically reflective coating.

Conveniently, the step of providing a plurality of corrugated sheets includes the step of forming corrugated sheets from substantially plane sheets by using pressing means to deform the substantially plane sheets into corrugated sheets while the sheets are in a ductile state.

Advantageously, the step of adhering adjacent sheets together includes the further step of slicing the adhered sheets into separate channel plates.

According to a fifth embodiment of the first aspect of the present invention, there is provided a method of forming an optical channel plate comprising substantially parallel optical waveguides comprising the steps of: providing a block of material; and b) machining the block to form substantially parallel optical waveguides therein.

Conveniently, the step of providing a block of material comprises providing a block of optically reflective material.

Advantageously, the step of machining the block includes the further step of coating the substantially parallel optical waveguides with optically reflective material to increase the internal optical reflectivity of the optical waveguides.

Advantageously, the step of machining the block to form substantially parallel optical waveguides therein comprises forming solid optical waveguides of the material of the block.

Alternatively, the step of machining the block to form substantially parallel optical waveguides therein comprises forming hollow optical waveguides within the material of the block.

Conveniently, the step of machining the block to form substantially parallel optical waveguides therein comprises machining under numerical control.

According to a second aspect of the present invention, there is provided a reflective optical channel plate for a front projection screen, the optical channel plate comprising a plurality of optical waveguides arranged in an array for location substantially perpendicular to a major plane of the screen such that light of a projected image entering first ends of the optical waveguides is collimated by the optical waveguides and reflected from opposed second ends of the optical waveguides respectively to be viewed after reflection with substantially no interference from stray light reflected from the second ends of the waveguides.

Conveniently, the optical waveguides are optical fibres.

Advantageously, the optical fibres are coated along their lengths to increase internal reflectivity of the optical fibres.

Conveniently, the optical waveguides are adhered together along their lengths.

Advantageously, the second ends of the optical fibres are coated to increase internal reflectivity of the second ends.

Advantageously, the optical waveguides are hollow optical waveguides.

Conveniently, the array of hollow waveguides has a honeycomb structure in transverse cross-section.

Conveniently, the optical waveguides have a circular transverse cross-section.

Alternatively, the optical waveguides have a polygonal, preferably hexagonal, transverse cross-section.

Conveniently, the channel plate is arcuate in a plane substantially perpendicular to the axes of the optical waveguides such that the channel plate forms a collimated convex or concave mirror.

According to a third aspect of the present invention, there is provided a transmission optical channel plate for a display screen, the optical channel plate comprising a plurality of optical waveguides for arrangement in an array substantially perpendicular to a major plane of the screen such that light of an image entering first ends of the optical waveguides is collimated and transmitted from opposed ends of the optical waveguides respectively.

Conveniently, the optical waveguides taper from the screen to produce a magnified image on the screen and longitudinal axes of the waveguides are at least partially arcuate such that light may enter ends of the waveguides at an angle substantially within the plane the screen to form a substantially flat display device.

Advantageously, the optical waveguides trifurcate into three optically connected sub-waveguides respectively such that light of different colours entering from each of the sub-waveguides respectively may be combined in each of the waveguides to illuminate a pixel on the screen, respectively.

Alternatively, the inner longitudinal surfaces of the waveguides are coated with photoelectric material, for the emission of electrons.

Advantageously, the axes of the optical waveguides are arcuate to increase the number of optical reflections from the coated inner longitudinal surfaces.

Embodiments of the invention will now be described by way of examples with reference to the accompanying drawings, in which.

In the Figures like reference numerals denote like parts.

Figure 1:
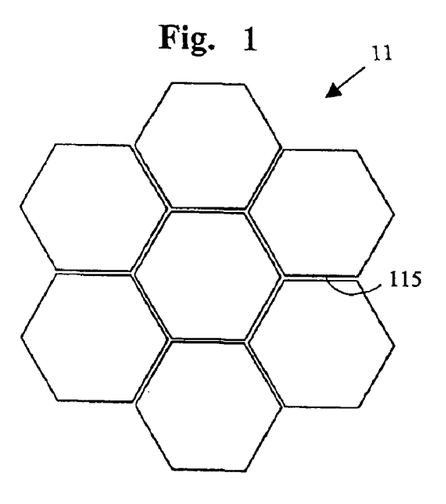
FIGS. 1 to 3 are cross-sectional views of portions of optical channel plates according to the present invention having optical waveguides of hexagonal, circular and triangular cross-sections, respectively.
Figure 2:
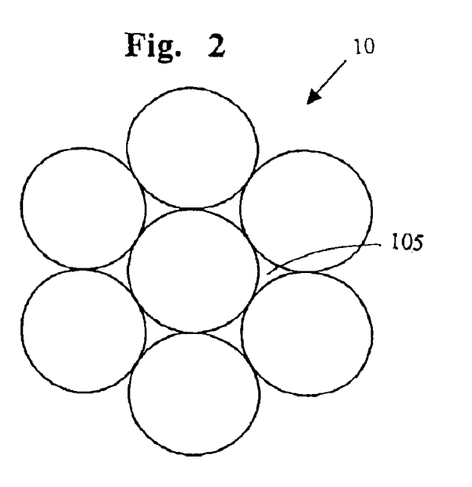
Figure 3:
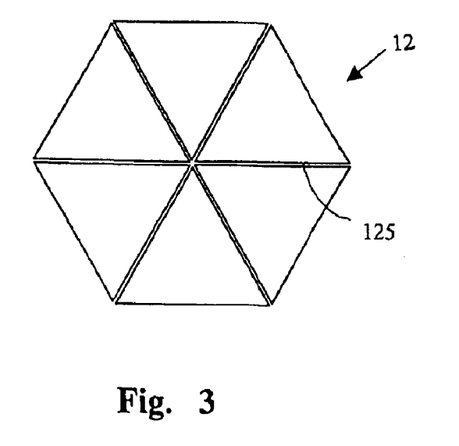
Figure 4:
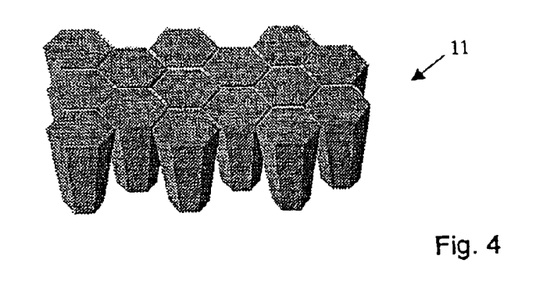
FIG. 4 is a perspective view of a portion of the optical channel plate of FIG. 1.
Figure 5:
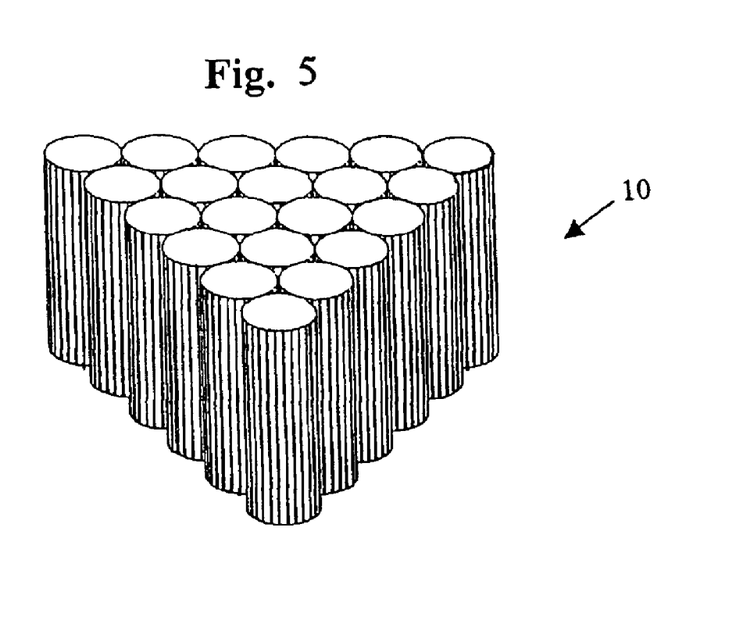
FIG. 5 is a perspective view of a portion of the optical channel plate of FIG. 2.

As shown in FIGS. 1 to 5, the optical channel plate of the present invention employs an array of aligned optical waveguides 10,11 or 12 which in the case of hexagonal 11 or triangular 12 cross-sections, as best shown in transverse cross-section of FIGS. 1 and 3, are closely packed with small interstitial spaces 115, 125 but are packed with large interstitial spaces 105 where the cross-section 10 of the waveguide is circular as shown in FIG. 2.

Figure 6:
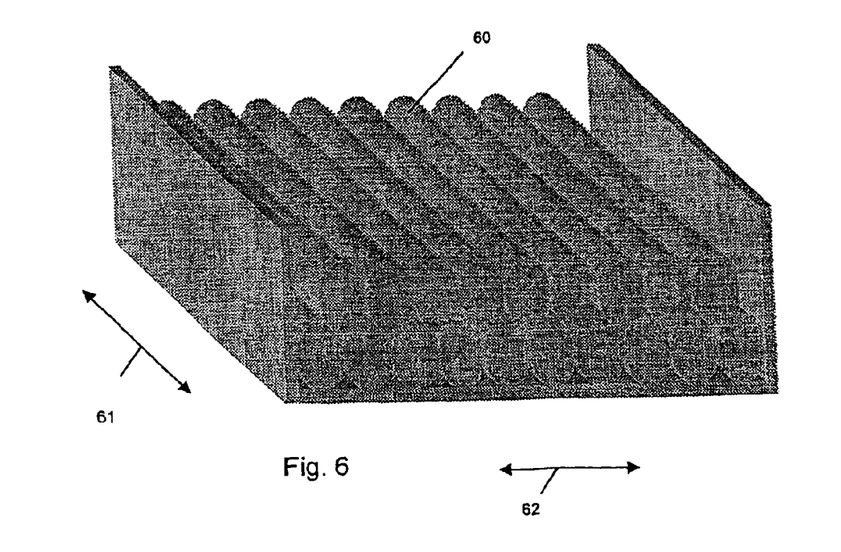
FIG. 6 is a perspective view of a means of aligning the optical fibres of the optical channel plate of FIG. 2, using ultrasonic vibrations, according to an embodiment of the present invention.

In one embodiment of the invention the waveguides are optical fibres. In order mutually to align the optical fibres 60 they may be assembled with their longitudinal axes horizontal and the optical fibres vibrated ultrasonically in the plane of their longitudinal axes in two mutually perpendicular directions, as indicated by double arrow headed lines 61,62 in FIG. 6, until the optical fibres fall into alignment under gravity. Alternatively, the optical fibres may be aligned by other mechanical means, for example, by centrifuging or under the influence of gravity, preferably assisted by vibration of the fibres.

Figure 7:
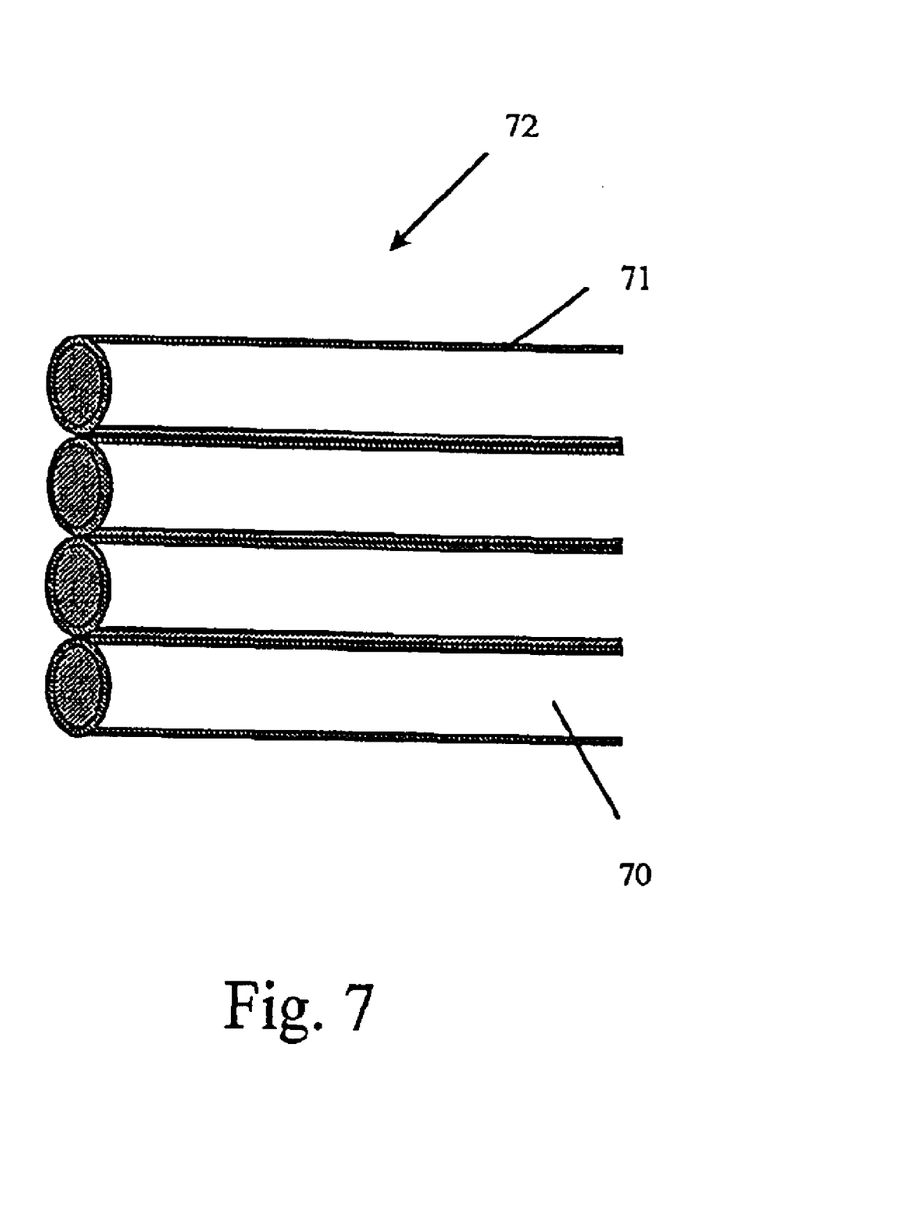
FIG. 7 is a partial cross-section of coated optical fibres of the optical channel plate of FIG. 2.

Referring to FIG. 7, before being aligned, the optical fibres 70 may have an external coating 71 applied to their longitudinal surfaces to improve the internal optical reflectivity of the fibres. Alternatively, it will be apparent to those skilled in the art that graded index fibres could be used wherein the index of refraction of the material of the fibre changes along the radius of the fibre, to improve the internal reflectivity.

The aligned optical fibres may then be adhered together by passing adhesive into and through the interstitial spaces 105,115,125 between the fibres. This is particularly appropriate in the case of, for example, fibres 10 with circular cross-section shown in FIG. 2. Alternatively, using coated fibres 72, the fibres may be adhered together at touching portions of adjacent fibres by ultrasonically vibrating the fibres causing local melting of the coating at points of contact and, hence, welding together the fibres, or by heating the fibres by other means. Alternatively a heat-activated, or other, adhesive may be used.

Figure 8A:
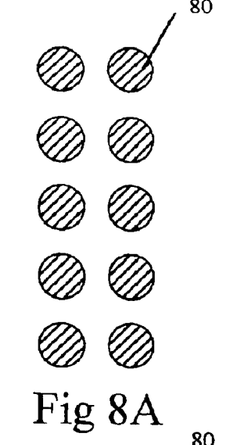
FIG. 8A is a transverse cross-section of an array of optical fibres of the optical channel plate of FIG. 1.
Figure 8B:
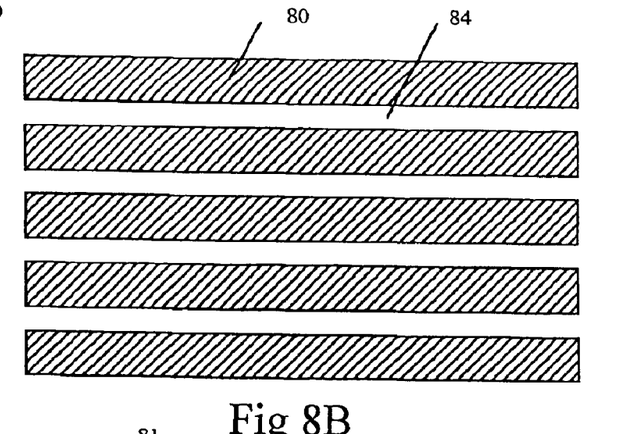
FIG. 8B is a longitudinal cross-section of the array of FIG. 8A.
Figure 8C:
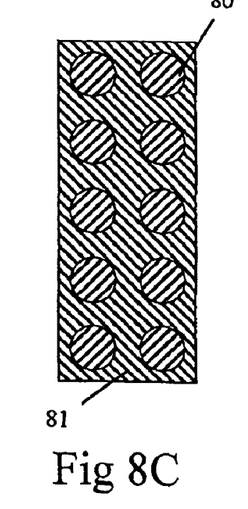
FIG. 8C—shows the array of FIG. 8A with a coating.
Figure 8D:
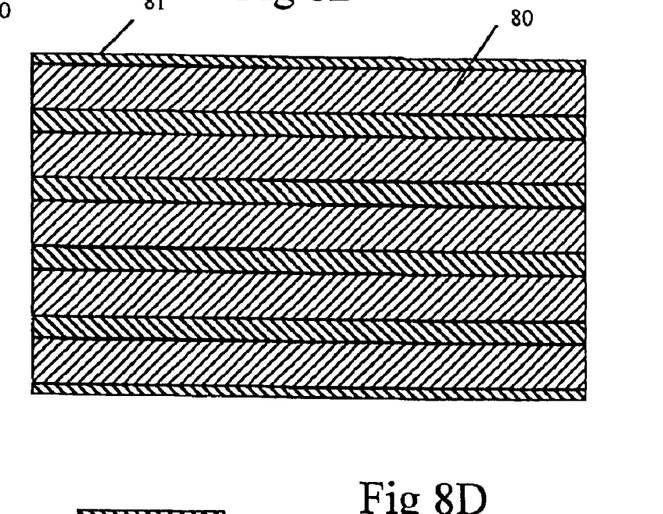
FIG. 8D—shows a longitudinal cross-section of the coated array of FIG. 8C.

Referring to FIG. 8, in a third method of manufacture according to the invention using an array of uncoated fibres 80, a coating solution may be passed through the interstitial spaces 84 to both form a coating 81 on the fibres and to bind the fibres 80 together in a bundle, see FIGS. 8C & 8D. In the interests of clarity of the figures the fibres are shown relatively further apart than they would be in practice. Such a coating process may use known electroplating techniques. It will be apparent that the third method of manufacture could also be used with precoated fibres and additional coating material could be used to bind the fibres together.

In the case of closely packed bundles, some difficulty may be experienced in passing either adhesives or coating solutions into the interstitial spaces. The fibres may therefore, in such a case, be clamped together in a spaced apart configuration, as shown in FIGS. 8A & 8B, rather than in their close packed configuration, shown in FIGS. 1 & 3, to permit sufficient interstitial space for the passage of such adhesive or coating solution. Alternatively, the fibres may be coated after they have been sliced into short lengths in a manner to be described.

Figure 8E:
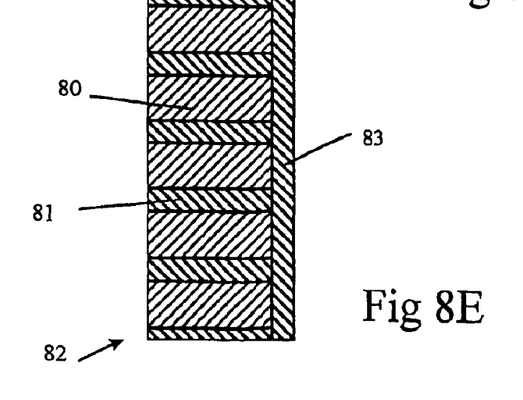
FIG. 8E—shows an optical channel plate formed from the array of FIG. 8D.

Once the array of optical fibres have been adhered together and/or coated in a bundle, the bundle is sliced into channel plates 82 by cutting at an angle perpendicular to the axes of the fibres in a manner known per se. The end faces of the optical fibre optics are polished. Where a reflective optical channel plate is required one of the end faces of the plate is then coated with a coating 83 of reflective material.

Referring to FIGS. 9A–9G, in an alternative embodiment of the invention, hollow optical waveguides 90 are used rather than optical fibres 80. In this embodiment an array of fibres 93, not necessarily optical fibres, are formed as in the first embodiment. As in the first embodiment, these fibres may be pre-coated or may be coated once assembled into the array with a coating 92 as described in the first embodiment. However, fibre material 93 is chosen which has a lower melting point than the melting point of the coating 92 and subsequent to assembling the coated fibres and slicing the assembly into slices 95, the plates are heated sufficiently to melt the fibre to form molten fibre material but to leave the coatings 92 unmelted. The molten fibre material is then removed from the slice to leave a honeycomb structure of hollow waveguides 90 formed by the coatings 92. It will be appreciated that the removal of the molten fibre material may be assisted by blowing through the honeycomb structure, where both ends of the channels are open. Alternatively, the removal of molten fibre can be facilitated by suction.

Figure 9A:
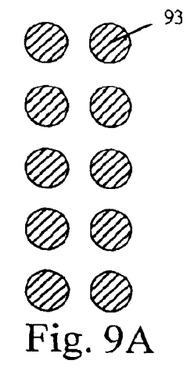
FIG. 9A—shows a transverse cross-section of fibres used in manufacture of a hollow optical waveguide channel plate of an embodiment of the present invention.
Figure 9B:
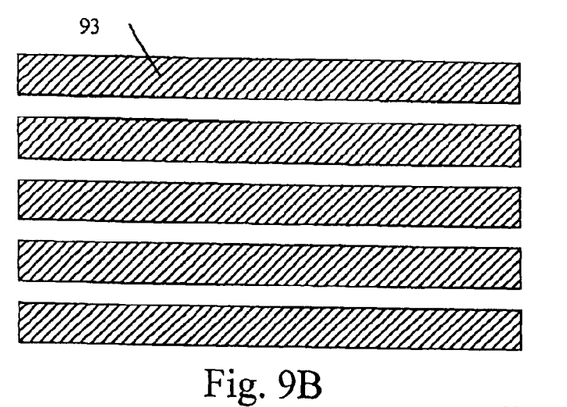
FIG. 9B—shows a longitudinal cross-section of the fibres of FIG. 9A.
Figure 9C:
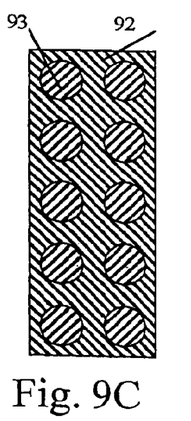
FIG. 9C—shows the array of FIG. 9A covered with a coating.
Figure 9D:
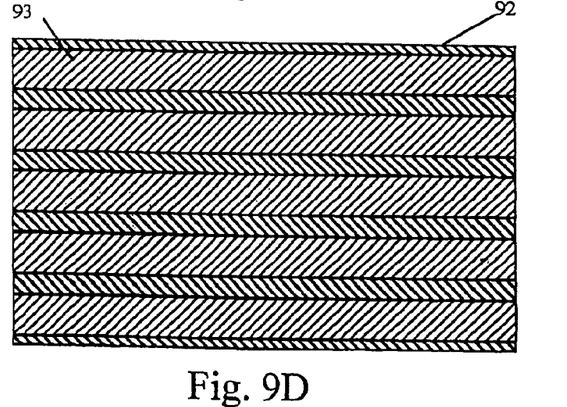
FIG. 9D—shows a longitudinal cross-section of the coated array of FIG. 9C.
Figure 9E:
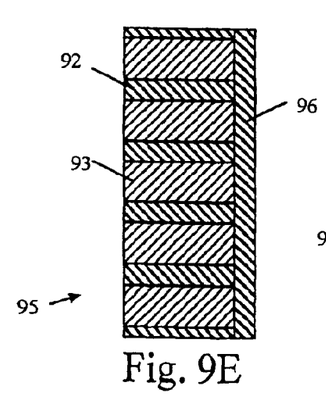
FIG. 9E—shows a longitudinal cross-section of a slice formed from the coated array of FIG. 9D.
Figure 9F:
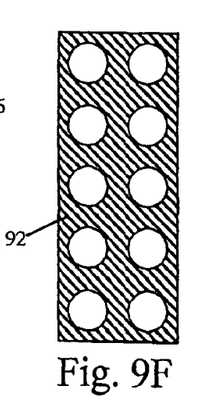
FIG. 9F—shows a transverse cross-section of a hollow waveguide channel plate formed from the slice of FIG. 9E after melting and removing the fibre material.
Figure 9G:
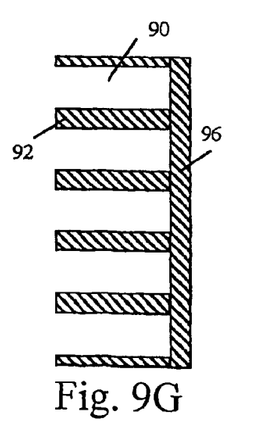
FIG. 9G—shows a longitudinal cross-section of the hollow waveguide channel plate of FIG. 9F.

In the case of the production of reflective optical fibre channels, one of the faces of the slice 95 is coated with a end coating 96 before the fibres are melted so that a honeycomb structure is formed with one end closed by optically reflective material.

Figure 18:
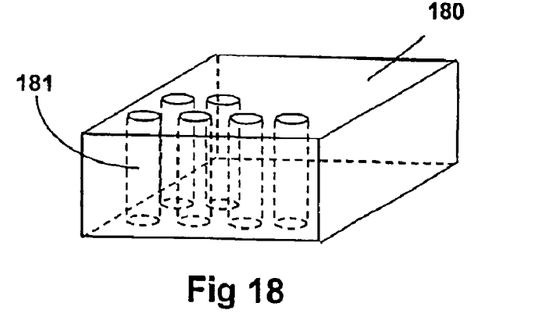
FIG. 18 is a perspective view of a machined block used in an embodiment of the invention for the production of an optical channel plate having hollow waveguides.
Figure 19:
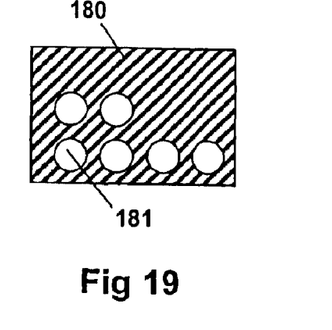
FIG. 19 is a top view of the machined block of FIG. 18.
Figure 20:
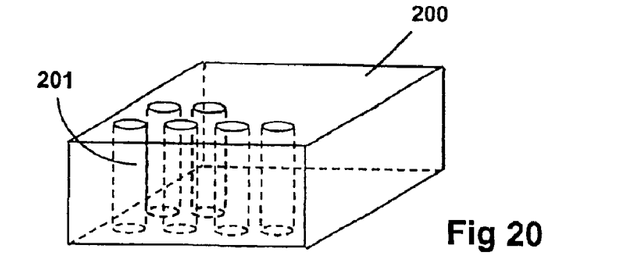
FIG. 20 is a perspective view of a further machined block used in an embodiment of the invention for the production of an optical channel plate having solid waveguides.

A further embodiment of the invention is shown in FIGS. 18–24, in which an optical channel plate is machined from a block of material 180, 200. In a first version of the embodiment as shown in FIGS. 18 and 19, an array of cylindrical bores 181 are drilled in the block 180 to form optical waveguides through the block. A perspective view of the drilled block is shown in FIG. 18 and a top view of the drilled block is shown in FIG. 19. In the interests of clarity the cylinders and distances are shown magnified in the figures, and only an exemplary number of cylinders are shown. In practice the cylinders may be drilled at a frequency of up to 10,000 holes/inch (4,000 holes/cm) using, for example, numerically controlled machining. The internal surfaces of the cylindrical bores may be coated with an optically reflective coating after drilling, so that the block of material 180 need not necessarily be of optically reflective material.

Although the cylindrical bores are shown as right circular cylinders, it will be understood that any other cross-sectional shape, for example cylinders having a hexagonal cross-section, may be machined instead.

As in embodiments previously described, the block may be sliced transversely to the axis of the cylinders, to provide a plurality of optical channel plates with hollow waveguides.

Figure 21:
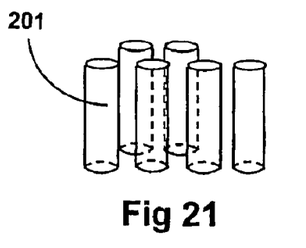
FIG. 21 is a perspective view of cylinders machined from the block of FIG. 20.
Figure 22:
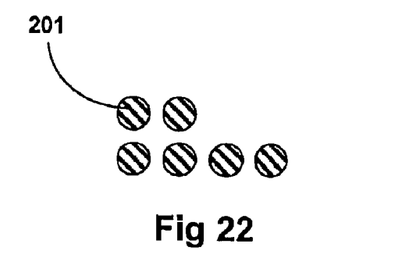
FIG. 22 is a top view of the cylinders of FIG. 21.
Figure 23:
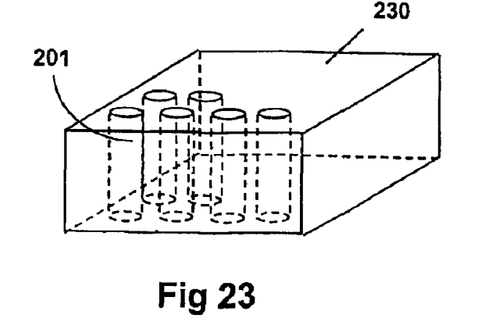
FIG. 23 is a perspective view of the cylinders of FIGS. 21 and 22 embedded in support material.
Figure 24:
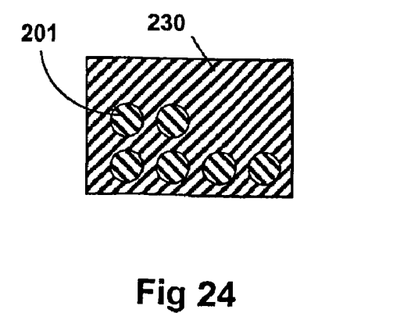
FIG. 24 is a top view of the cylinders of FIG. 23.

A second version of this embodiment is shown in FIGS. 20 to 24, in which material of the block 200 is machined away to leave an array of solid cylinders 201 of the block material, as shown in perspective view in FIG. 21 and as an end view in FIG. 22. In this version of the embodiment the block 200 is therefore necessarily of optically transparent material. The cylinders may be coated to increase the internal optical reflectivity of walls of the waveguides thus formed. As shown in FIGS. 23 and 24 this coating, or other additional material, may be introduced in the interstitial spaces between the cylinders to act as a mechanical support for the cylinders. As in the previously described version of this embodiment, the block 230 of cylinders embedded in support material may then be sliced if required to form a plurality of optical channel plates with solid waveguides, or the block may be used as a single optical channel plate. It will be understood that once again the waveguides do not necessarily have a cylindrical cross-section but may, for example, have a hexagonal cross-section.

Figure 25:
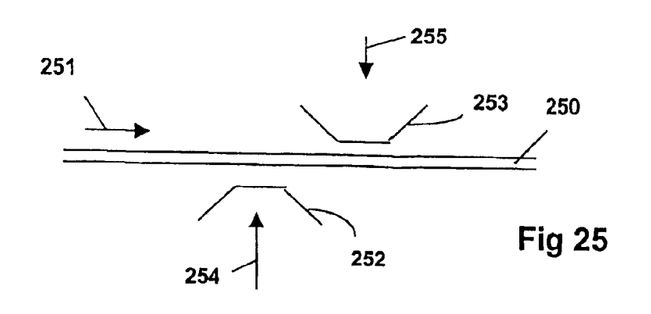
FIG. 25 is a schematic view of a sheet of material and opposed dies used in an embodiment of the invention.
Figure 26:
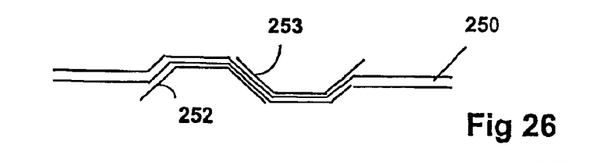
FIG. 26 is a schematic view of the sheet and dies of FIG. 25, showing the dies deforming the sheet to form a corrugated sheet.
Figure 27:
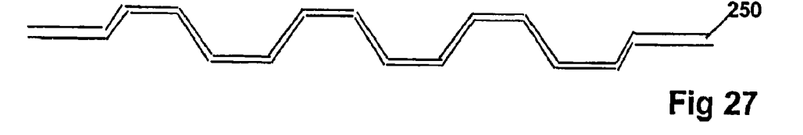
FIG. 27 is a schematic view of a corrugated sheet of FIG. 26.

A further embodiment of the invention is shown in FIGS. 25 to 28. In this embodiment a sheet of material 250 is passed in direction of arrow-headed line 251 between a first die 252 and an opposed offset second die 253. The first die and the second die 253 each have a working head in the shape of a half hexagon. The sheet 250 may be paused with a section of the sheet 251 between the dies, and the first die 252 moved in the direction of the arrow-headed line towards the sheet to deform the sheet and the second die 253 moved in an opposed direction to that of the first die towards the sheet to deform the sheet, in the direction of arrow headed line 255, but offset from the first die. In this manner, first and second opposed corrugations 261 and 262 of half-hexagonal shape are formed in the sheet 250. The dies are then withdrawn and the sheet stepped forward in the direction of arrow headed line 251 to form a second pair of corrugations adjacent to the first pair to form a corrugated sheet as shown in FIG. 27. Some thinning of the sheet will necessarily occur during pressing and this is allowed for in the original selection of the thickness of the supplied sheet.

Although the dies have been shown and described as having working heads which are in the shape of half hexagons, it will be understood that differently shaped working heads may be used to form corrugations of different shapes, for example, semicircular working heads may be used.

It will be apparent that the sheet 250 must be sufficiently ductile to be deformed into corrugations. In the case of a glass sheet this ductility may be achieved by working the sheet at a temperature above room temperature at which the glass is ductile. Conveniently, this may be done immediately after manufacture of the glass sheet before the sheet has cooled from the manufacturing process.

As an alternative to the discontinuous process described, in which the first and second dies 254, 255 move in a direction transverse to the plane of the sheet 250, a series of die heads may alternatively each be mounted on respective first and second offset drums (not shown) having respective axles parallel to the plane of the sheet so that the sheet is continuously passed between the respective drums such that successive die heads on each respective drum deform the sheet. It will be apparent that some adaptation of the shape of the die heads may be required to achieve the required corrugations in this case to allow continuous movement of the sheet between the respective drums.

Figure 28:
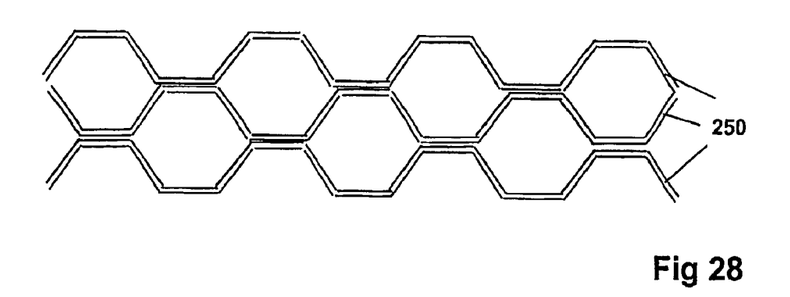
FIG. 28 is a schematic view of a stack of corrugated sheets of FIG. 27.

A number of corrugated sheets formed in this manner may then be stacked one upon another as shown in FIG. 28 to define channels therebetween having, in the case of half-hexagonal dies, a hexagonal cross-section. As shown in FIG. 28, a plurality of such sheets may be stacked one upon another to form an array of channels, in which the channels in successive layers are offset from each other. The corrugated sheets may be transported and/or stacked using numerically controlled machinery.

Where the sheet 250 is of optically reflective material, these channels form hollow waveguides. Where the sheets are not of optically reflective material, or to increase the optical reflectivity, the inner surfaces of the channels may be coated with optically reflective material to form hollow waveguides.

The stacked corrugated sheets may be adhered together at the points of contact by any known method, dependent on the material of the sheets 25, for example they may be welded together or adhesive may be used. Where the sheets are of glass at an elevated temperature the sheets may be pressed together as the glass cools so that the sheets are melded together.

It will be appreciated that the blocks of waveguides so formed may be transversely sliced if so desired to form a plurality of optical channel plates with hollow optical waveguides.

In one example of the embodiment the sheet of material is a metre wide in the direction transverse to the direction of motion shown by arrow headed line 251.

It will be appreciated that with suitable adaptation of the placement and shape of the dies, an optical channel plate with solid waveguides may be formed.

Figure 10:
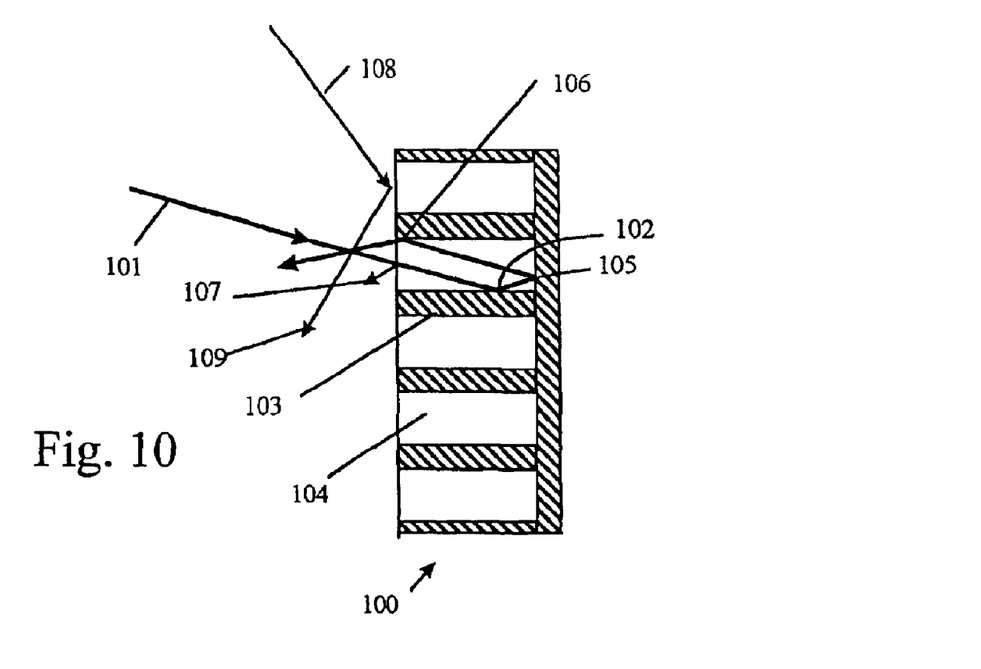
FIG. 10—shows light rays reflected from the reflective optical fibre channel plate of FIG. 8E.
Figure 11:
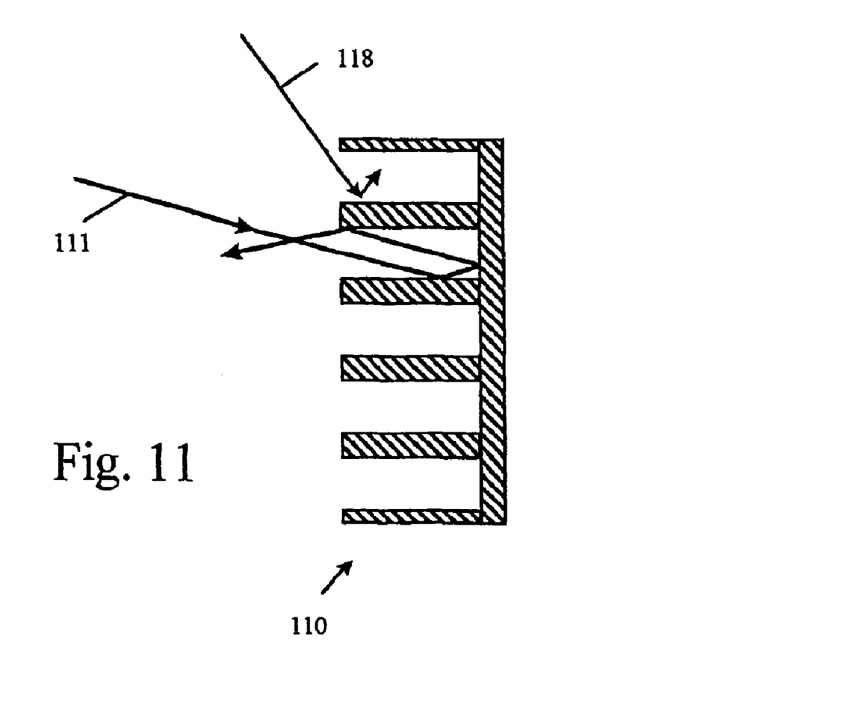
FIG. 11—shows light rays reflected from the hollow optical waveguide reflective optical channel plate of FIG. 9G.

Referring to FIG. 10, for use as a front projection screen 100, or a front projection display, an image is projected from a projector onto the uncoated or open ends of a reflective optical channel plate and the light 101 from the projector is collimated by reflections 102 from the side walls 103 of the optical waveguides 104, non-specularly reflected 105 from the end of the waveguides opposed to the end at which the light enters the waveguides and further collimated by further reflection 106 from the side walls 103 before emerging from the uncoated end of the optical channel plate. A small portion 107 of the incident light 101 may be reflected from the uncoated end of the optical channel plate. However, in general, stray light 108 entering the waveguides at an angle greater than that at which the image enters will not be reflected back to a viewer to degrade the image. Some stray light 109 may be reflected from the uncoated end face of the optical channel pate. In addition, the reflected light is collimated, so that a much larger proportion is reflected towards a viewer than would be in the case of light scattered from a known screen without an optical channel plate. It will be evident that the invention, therefore, also has application wherever a high reflectively with collimation is required, for example, on vehicle reflectors or road signs. As shown in FIG. 11, the use of the hollow waveguides 111 overcomes the problem of reflection from the front face of the channel plate which may be experienced with a reflective optical channel using optical fibres. In this case incident stray light 118 is largely absorbed by repeated reflections within the hollow waveguide.

The reflective optical channel plate also has application in, for example, large screen displays for reflecting images projected onto the side of a building.

Figure 12:
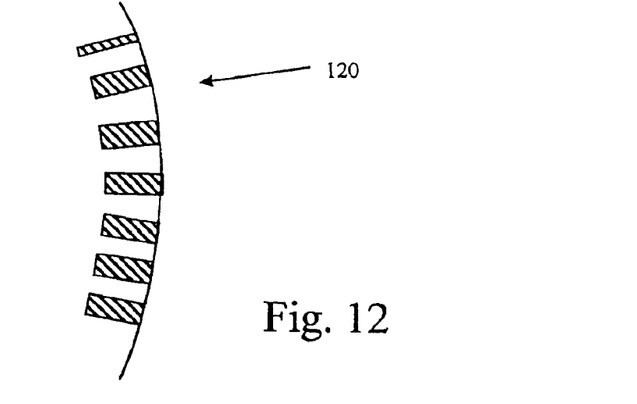
FIG. 12—shows a cross-section of a concave optical channel plate mirror according to the invention.

Referring to FIG. 12, a further application of the reflective optical channel plate is for the production of concave 120 or convex mirrors by forming a reflective channel plate into a required concave or convex shape. Such optical channel mirrors, using specular reflections, have particular application in reflective telescopes for providing high reflectivity and reducing reflection of stray light.

It will be apparent that transmission optical channel plates located on a viewing side, or front, of a rear projection or phosphor screen can similarly be used to reduce the effect of reflection of stray or ambient light from the front of the screen, to enhance the contrast of an image projected or produced on the rear of the screen, similarly to the use of reflective optical channel plates illustrated in FIGS. 10 and 11.

Figure 10A:
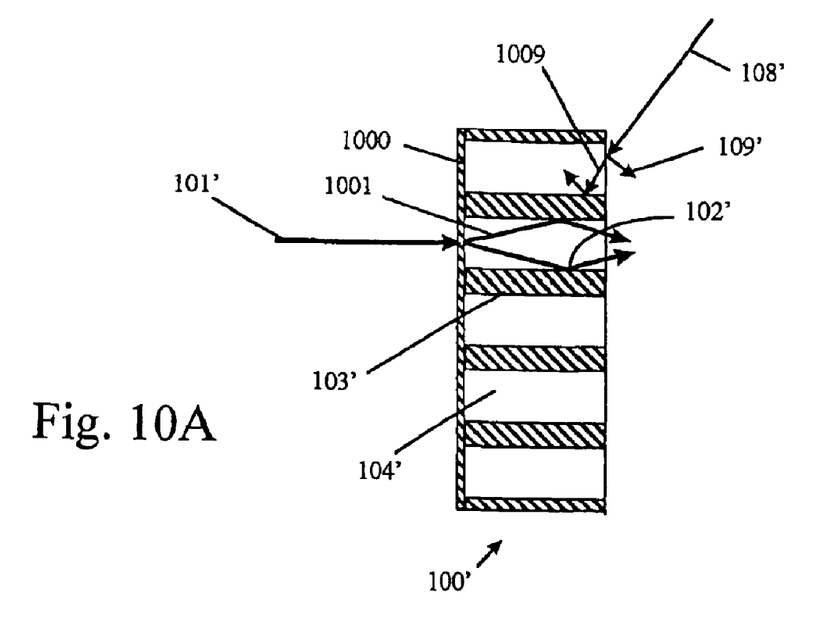
FIG. 10A—shows light rays collimated and reflected from a transmission optical fibre channel plate of an embodiment of the invention.

In the case of transmission optical fibre channel plates, as shown in FIG. 10A, a rear projection beam 101' incident on a rear projection or phosphor screen 1000 causes the scattering or emission of light, respectively, from the screen so that light rays 1001 are collimated by reflections 102' from the side walls 103' of the optical waveguides 104' before emerging from an uncoated end of the optical channel plate. However, in general, stray light 108' incident on a viewing side of the screen is weakly reflected 109' from the surface of the waveguide but predominantly is refracted 1009 into the waveguide and absorbed by repeated reflections so that stray light does not interfere with the image.

Figure 11A:
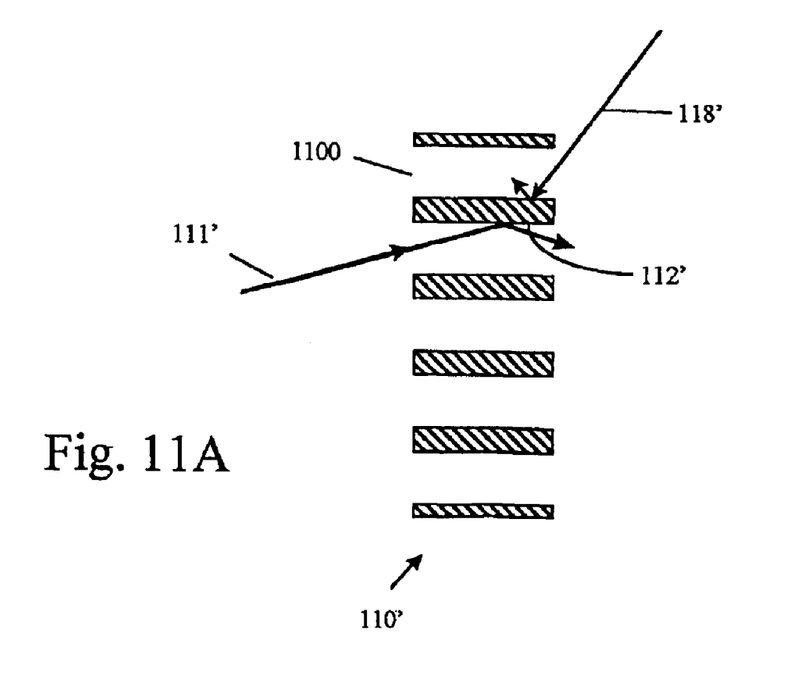
FIG. 11A—shows light rays collimated and reflected from a transmission hollow optical waveguide channel plate of an embodiment of the invention.

As shown in FIG. 11A, a hollow optical waveguide channel transmission plate may be used without a scattering or phosphor screen. A rear projection beam 111', such as a laser beam, is scattered by reflections 112'. Incident stray light 118' on a viewing side of the screen is, however, absorbed by repeated reflections within the hollow waveguide, so as not to interfere with a viewed image produced by the light rays 1101.

Figures 13, 14:
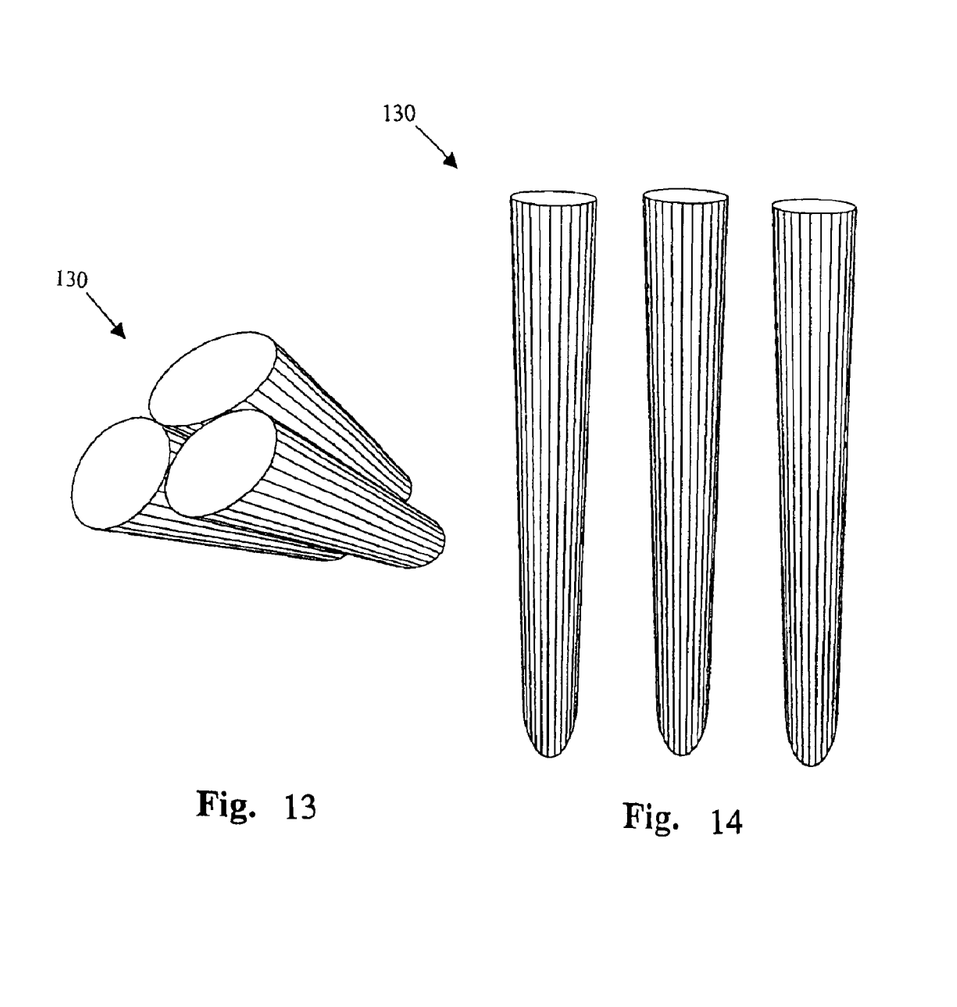
FIG. 13 & FIG. 14—show tapered optical fibres used in an embodiment of the present invention.

Transmission optical channel plates have particular application in association with flat displays. For example, by the use of tapered fibres 130, as shown in FIGS. 13 & 14, transmission optical channel plates can be used to produce an enlarged image by projecting an image onto the small diameter ends of the tapered fibres to be emitted from the larger diameter end of the fibres. Such tapered fibres are known per se for use with displays from, for example, WO 97/38329 and FR 2628875 in which the optical fibres are fabricated by drawing under gravity.

Figure 15A:
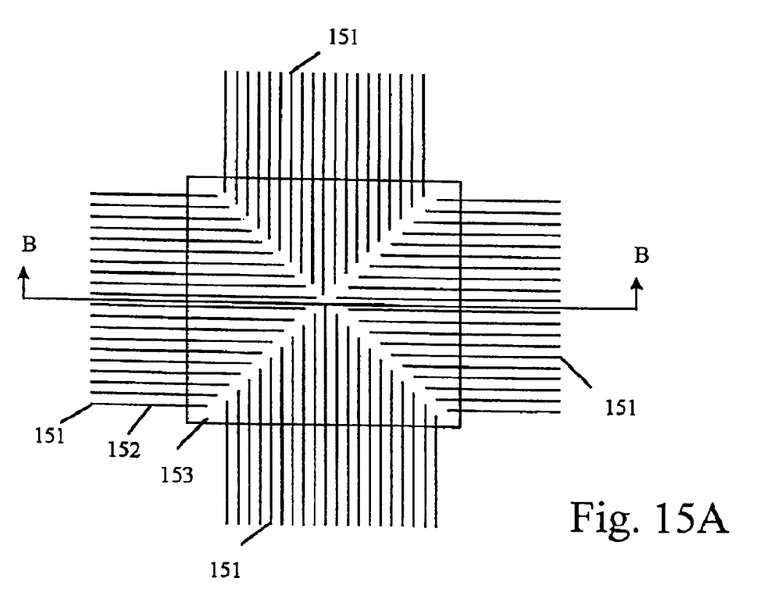
FIG. 15A—shows a flat display device using the tapered optical fibres of FIGS. 13 & 14.
Figure 15B:
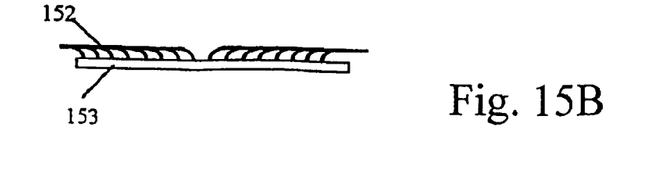
FIG. 15B—shows a cross-section of a line B—B of FIG. 15A.

In a further application of the invention, waveguides may be used to deliver an image to the rear of a display screen, as shown in a schematic representation in FIGS. 15A & 15B, which show only representative examples of the optical fibres of the channel plate array. Such a transmission optical channel plate using tapered waveguides, can be used to produced extremely high resolution displays. For example, mechanical or quartz light rotators may be used to deliver horizontal or vertical scans to the input ends 151 of the optical waveguides 152. As shown in FIG. 15B, the optical waveguides can be curved so that the entry points of the fibres are more or less in a plane of the display screen 153 which they are illuminating. In this way, substantially flat display devices may be produced.

Bending of the optical waveguides of a transmission optical channel plate can also be employed to produce lenses, for example, for the concentration of solar radiation in a manner analogous to the production of a concave mirror shown in FIG. 12. A further application may be in spectacle lenses.

In a similar manner, where the waveguides are of photoemissive material or are coated with photoemissive material, such channel plates may be used in photomultipliers. In one embodiment, the waveguides, if electrically conductive, are electrically insulated from each other, for example, by an insulating coating. If photons are incident on the walls of a waveguide, electrons will be emitted from the walls. If the channel plate is subjected to an electric field the electrons may subsequently be accelerated towards and be incident on a phosphor screen to cause the emission of light.

Figure 16:
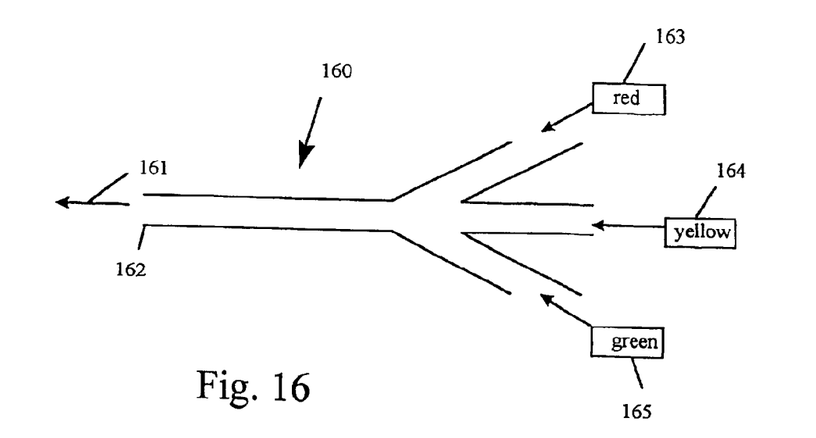
FIG. 16—shows a trifurcated optical fibre for use in the present invention.

As shown in FIG. 16, colour mixing of displays can also be improved over known displays by passing coloured light from three separate light sources through single fibres 160 of an optical channel plate to be produced in a required colour 161 at an emission end 162 of the fibres. This, for example, may be done by optically coupling three fibres together into the input of the waveguide of a transmission optical channel plate, the three fibres being illuminated by three differently coloured light sources 163,164,165. This overcomes the problem of colour separation frequently encountered with large screen back projection displays due to the physical separation, for example, of phosphors on a screen for each of the three constituent colours. Because in this way a coloured pixel is produced with a single pixel rather than with three differently coloured pixels as in the prior art, a 3:1 increase in resolution of the screen is obtained.

Figure 17:
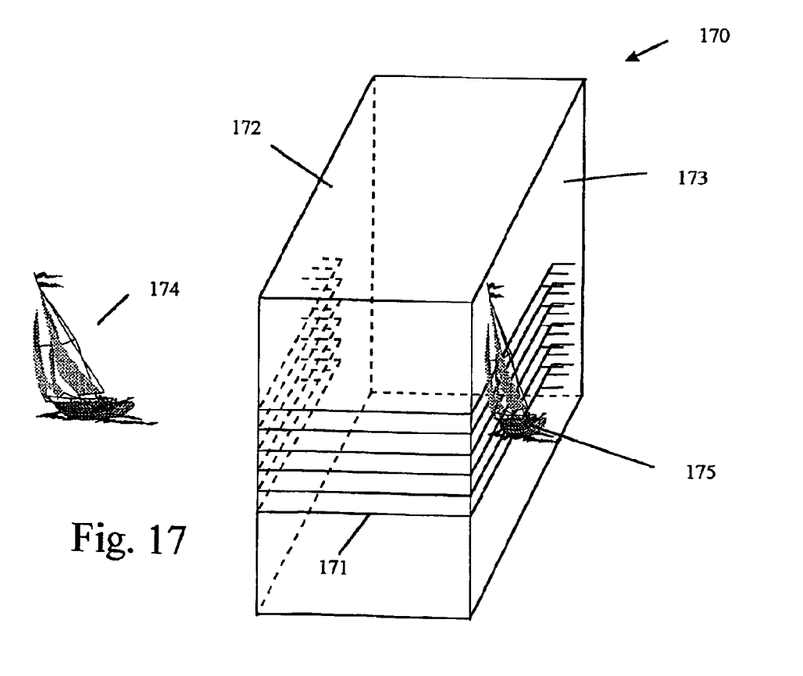
FIG. 17—shows an application of channel plates of the present invention for producing an image on a side of building, the image being transmitted from an opposed side of the building.

Referring to FIG. 17, a further, large scale, application of the transmission channel plates of the invention is the production of plates which bend around, or pass through a building 170 so that an input end of the plate covers, for example, one face 172 of the building and the output end of the plate covers an opposed face 173 of the building. In the interests of clarity of the figure, only representative examples of the optical waveguides of the channel plate array are shown in the figure. In this manner, light received on one side of the building is transmitted to the opposed side of the building so that, if the input and output of all the fibres are respectively aligned on either side of the building, an image of the view 174 as seen from one side of the building is transmitted and displayed as an image 175 on the opposed side of the building, so that the building effectively becomes invisible.

What is claimed is:

1. A reflective optical channel plate for a front projection screen, the optical channel plate comprising a plurality of hollow optical waveguides arranged in an array for location substantially perpendicular to a major plane of the screen such that light of a projected image entering first ends of the optical waveguides is collimated by the optical waveguides and reflected from opposed second ends of the optical waveguides respectively to be viewed after reflection with substantially no interference from stray light reflected from the second ends of the waveguides.

2. A reflective optical channel plate as claimed in claim 1, wherein the hollow optical waveguides are hollow optical fibres.

3. A reflective optical channel plate as claimed in claim 2, wherein the optical fibres are coated along their lengths to increase internal reflectivity of the optical fibres.

4. A reflective optical channel plate as claimed in claim 1, wherein the optical waveguides are adhered together along their lengths.

5. A reflective optical channel plate as claimed in claim 2, wherein the second ends of the optical fibres are coated to increase internal reflectivity of the second ends.

6. A reflective optical channel plate as claimed in claim 1, wherein the array of hollow waveguides has a honeycomb structure in transverse cross-section.

7. A reflective optical channel plate as claimed in claim 1, wherein the optical waveguides have a circular transverse cross-section.

8. A reflective optical channel plate as claimed in claim 1, wherein the optical waveguides have a polygonal, preferably hexagonal, transverse cross-section.

9. A reflective channel plate as claimed in any of claim 1, for a reflective telescope, wherein the channel plate is arcuate in a plane substantially perpendicular to the axes of the optical waveguides such that the channel plate forms a collimated convex or concave mirror.

10. A transmission optical channel plate for a display screen, the optical channel plate comprising a plurality of optical waveguides for arrangement in an array substantially perpendicular to a major plane of the screen such that light of an image entering first ends of the optical waveguides is collimated and transmitted from opposed ends of the optical waveguides respectively wherein the optical waveguides trifurcate into three optically connected sub-waveguides respectively such that light of different colours entering from each of the sub-waveguides respectively may be combined in each of the waveguides to illuminate a pixel on the screen, respectively.

11. A transmission optical channel plate as claimed in claim 10, wherein the optical waveguides taper from the screen to produce a magnified image on the screen and longitudinal axes of the waveguides are at least partially arcuate such that light may enter ends of the waveguides at an angle substantially within the plane the screen to form a substantially flat display device.

12. A transmission optical channel plate for a display screen, the optical channel plate comprising a plurality of optical waveguides for arrangement in an array substantially perpendicular to a major plane of the screen such that light of an image entering first ends of the optical waveguides is collimated and transmitted from opposed ends of the optical waveguides respectively, for a photomultiplier wherein the inner longitudinal surfaces of the waveguides are coated with photoelectric material, for the emission of electrons.

13. A transmission optical channel plated as claimed in claim 12, wherein the axes of the optical waveguides are arcuate to increase the number of optical reflections from the coated inner longitudinal surfaces.

* * * * *